(12) United States Patent
Chuang et al.

(10) Patent No.: US 7,884,662 B1
(45) Date of Patent: Feb. 8, 2011

(54) MULTI-CHANNEL INTEGRATOR

(75) Inventors: Kai-Lan Chuang, Tainan County (TW);
Guo-Ming Lee, Tainan County (TW);
Ying-Lieh Chen, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 0 days.

(21) Appl. No.: 12/561,861

(22) Filed: Sep. 17, 2009

(51) Int. Cl.
*H03K 5/00* (2006.01)
(52) U.S. Cl. .................. 327/337; 327/336; 327/554; 327/558; 327/509
(58) Field of Classification Search ......... 327/336–337, 327/551–559, 506–515
See application file for complete search history.

(56) References Cited

U.S. PATENT DOCUMENTS 5,113,077 A * 5/1992 Shimizu et al. ........ 250/370.11
5,281,860 A * 1/1994 Krenik et al. ............... 327/407
5,548,122 A * 8/1996 Shoji .................... 250/370.09

* cited by examiner

*Primary Examiner*—Dinh T. Le
(74) *Attorney, Agent, or Firm*—J.C. Patents

(57) ABSTRACT

A multi-channel integrator includes a first switch, a second switch, and a plurality of integration units. First terminals of the first and second switches receive a first reference voltage. Each of the integration units includes an operational amplifier (OP-AMP), a feedback switch, a third switch, a fourth switch, and a feedback capacitor. A second input terminal of the OP-AMP receives a second reference voltage. Two terminals of the feedback switch are respectively coupled to a first input terminal and an output terminal of the OP-AMP. First terminals of the third switch and the fourth switch are respectively coupled to the first input terminal and the output terminal of the OP-AMP. A first terminal of the feedback capacitor is coupled to the second terminals of the first and the third switches. A second terminal of the feedback capacitor is coupled to the second terminals of the second and the fourth switches.

14 Claims, 4 Drawing Sheets

MULTI-CHANNEL INTEGRATOR

BACKGROUND OF THE INVENTION

1. Field of the Invention

The present invention relates to an integrator, and more particularly, to a multi-channel integrator.

2. Description of Related Art

With the blooming development in the electronic technology, and the prevalence of wireless communication and the internet, a variety of electronic devices are becoming indispensable in people's day-to-day life and work. However, it is rather difficult to operate the most common input-output (I/O) interface, such as a keyboard or a mouse. Compared with a keyboard and a mouse, a touch panel is a simpler I/O interface. Therefore, the touch panel is usually applied as a man-machine interface between a man and an electronic device so as to perform some control operation.

Generally speaking, the touch panel can be classified into a resistive touch panel, an optics touch panel, and a capacitive touch panel, etc. On the other hand, the touch panel can also be classified into a current-type touch panel and a charge type touch panel when being classified in a readout manner. FIG. 1 is a schematic diagram of a capacitive touch panel and a traditional readout circuit. A common capacitive touch panel 110 has a plurality of sensor lines both in the Y-axis direction and in the X-axis direction. A coupling capacitor Cp is formed between one of the sensor lines in the Y-axis direction and one of the sensor lines in the X-axis direction.

Each of the sensor lines is with an integrator 120. Besides, an operational amplifier (OP-AMP) 122 and a feedback capacitor Cfb are disposed in each of the integrators 120. In the beginning, a non-inverting input terminal of each of the OP-AMPs 122 receives a 0V reference voltage $V_{ref}$ and each of switches 123 is turned on. Thus, each of the sensor lines is charged to 0V. Next, each of the integrators 120 turns off the switch 123 thereof so as to perform a readout operation. If no conductor, such as a finger, is approached to or touches the touch panel 110 during a turn off period of the switch 123, the voltage of two terminals of the coupling capacitor Cp are changed to 5V by the integrators 120 in the Y-axis direction and in the X-axis direction as the reference voltage $V_{ref}$ is transferred from 0V to 5V. Since there is no need to charge and discharge the coupling capacitor Cp, the variation that the reference voltage $V_{ref}$ is transferred from 0V to 5V is reflected on the output of integrator 120. After each of the integrators 120 complete the readout operation, each of the switches 123 are turned on again. And the above-mentioned steps are repeated all over again.

When a conductor, such as a finger, touches the touch panel 110, an extra capacitor Cf is formed at a corresponding location as shown in FIG. 1. During the turn off period of the switch 123, when the reference voltage $V_{ref}$ is transferred from 0V to 5V, the corresponding integrator 120 needs to charge and discharge the extra capacitor Cf through one of the sensor lines. Hence, the output OUT of the integrator 120 corresponding to the extra capacitor Cf changes as the reference voltage $V_{ref}$ is transferred from 0V to 5V, which is represented as OUT=5+[(5V−0V)×Cf]/Cfb. The integrator 120 transmits the readout result to following circuits, which includes a digital to analog convertor and an image processing circuit (not shown), so that the location coordinate is determined. Hence, the touch location is determined upon the difference readout data between the sensor line with the extra capacitor Cf and the sensor line without the extra capacitor Cf.

From the foregoing equation, the larger the extra capacitor Cf is, the larger the feedback capacitor Cfb is needed. Otherwise, the touch location can not be determined due to the output saturation of the integrator 120. However, in order to prevent the output saturation of the integrator 120, the capacitance of the feedback capacitor Cfb is needed to be increased, i.e. the area of the feedback capacitor Cfb is needed to be increased. Since each of the sensor lines needs one integrator 120, the chip area occupied by the integrator 120 is significantly large.

SUMMARY OF THE INVENTION

The present invention provides a multi-channel integrator using common feedback capacitors to significantly reduce a chip area occupied by the multi-channel integrator.

An embodiment of the present invention provides a multi-channel integrator including a first switch, a second switch and a plurality of integration units. First terminals of the first switch and the second switch receive a first reference voltage. Each of the integration units includes an operational amplifier (OP-AMP), a feedback switch, a third switch, a fourth switch, and a feedback capacitor. The OP-AMP has a first input terminal, a second input terminal and an output terminal, wherein the second input terminal receives a second reference voltage. A first terminal and a second terminal of the feedback switch are respectively coupled to the first input terminal and the output terminal of the OP-AMP. A first terminal of the third switch is coupled to the first input terminal of the OP-AMP. A first terminal of the fourth switch is coupled to the output terminal of the OP-AMP. A first terminal of the feedback capacitor is coupled to the second terminal of the first switch and the second terminal of the third switch. A second terminal of the feedback capacitor is coupled to the second terminal of the second switch and the second terminal of the fourth switch.

Another embodiment of the present invention provides a multi-channel integrator including a first switch, a second switch, a feedback capacitor and a plurality of integration units. First terminals of the first switch and the second switch receive a first reference voltage. A first terminal and a second terminal of the feedback capacitor are respectively coupled to a second terminal of the first switch and a second terminal of the second switch. Each of the integration units includes an operational amplifier (OP-AMP), a feedback switch, a third switch, and a fourth switch. The OP-AMP has a first input terminal, a second input terminal and an output terminal, wherein the second input terminal receives a second reference voltage. A first terminal and a second terminal of the feedback switch are respectively coupled to the first input terminal and the output terminal of the OP-AMP. A first terminal of the third switch is coupled to the first input terminal of the OP-AMP, and a second terminal of the third switch is coupled to the first terminal of the feedback capacitor. A first terminal of the fourth switch is coupled to the output terminal of the OP-AMP, and a second terminal of the fourth switch is coupled to the second terminal of the feedback capacitor.

Accordingly, the channels of the multi-channel integrator share a set feedback capacitor or one capacitor by turns, so that the chip area occupied by the multi-channel integrator is significantly reduced as well as the cost.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The following embodiments use a capacitive touch panel as an example to illustrate the application of a multi-channel integrator of the present invention. However, the embodiments are not intended to limit the present invention. The present invention may not only be applied to a charge type touch panel, but also to a circuit or an electronic product that needs a multi-channel integrator according to the teaching of the embodiments of the present invention.

Figure 1:
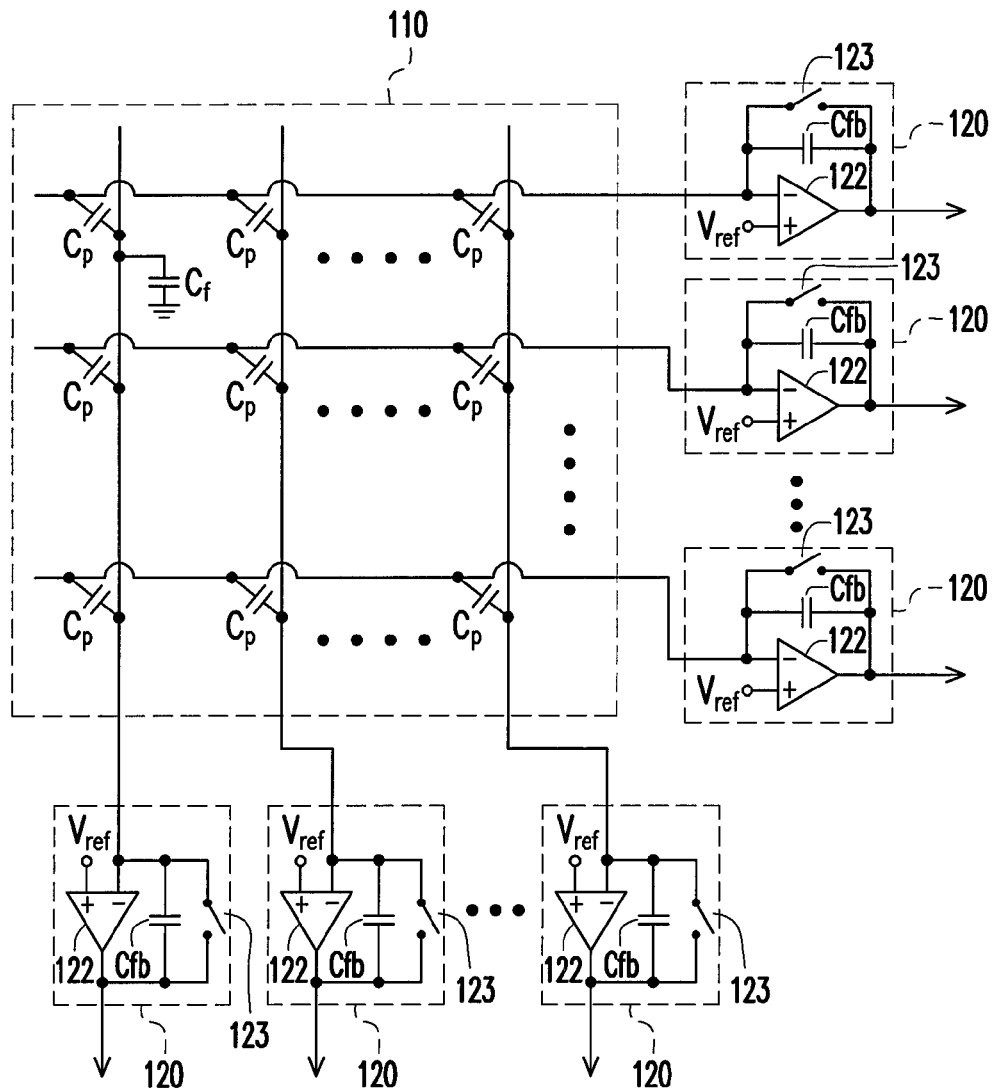
FIG. 1 is a schematic diagram of a capacitive touch panel and a traditional readout circuit.
Figure 2:
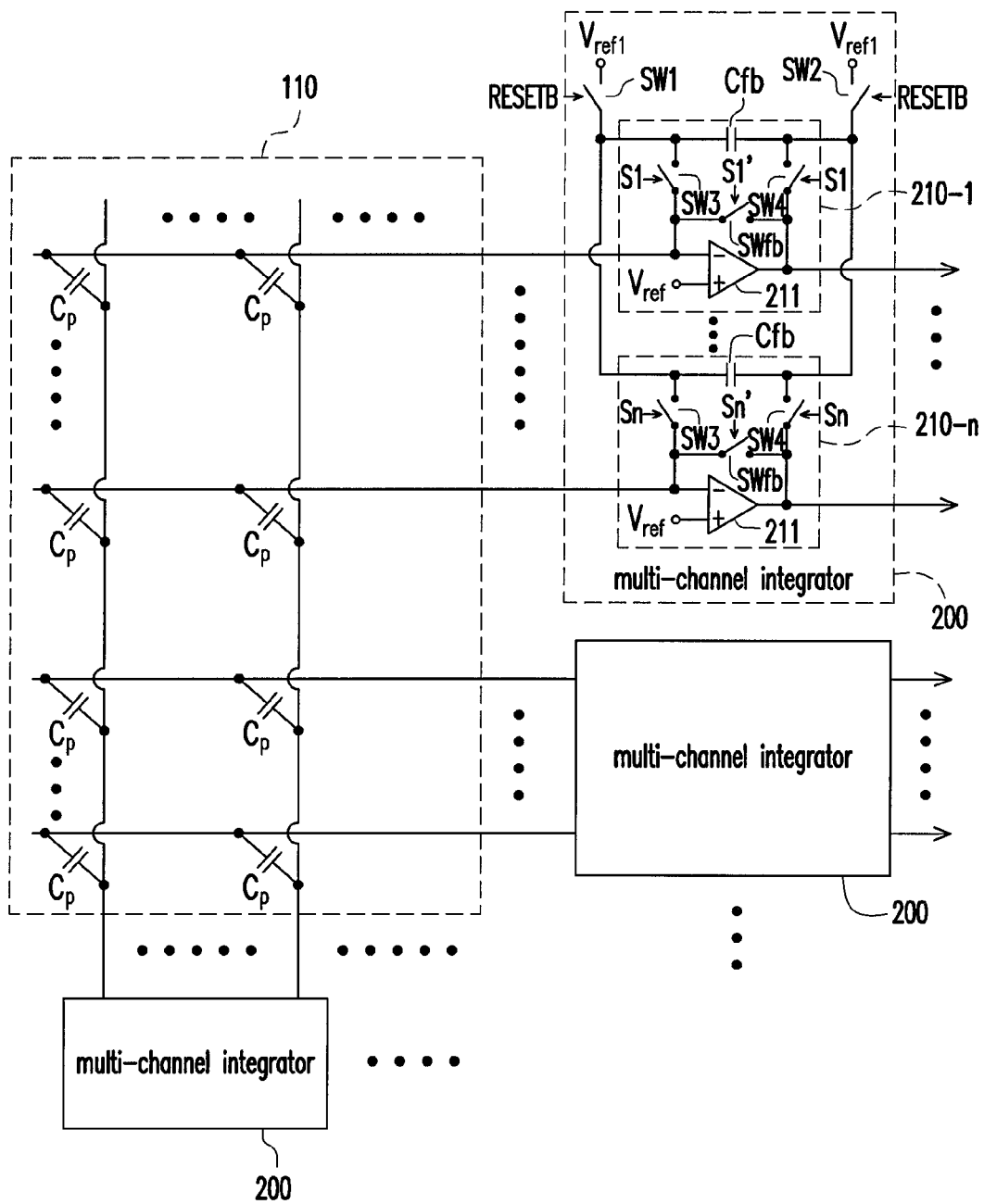
FIG. 2 is a circuit diagram of a multi-channel integrator in an embodiment of the present invention.

FIG. 2 is a circuit diagram of a multi-channel integrator in an embodiment of the present invention. The multi-channel integrator 200 has n channels, and an integration unit is disposed in each of the channels. In the drawing, only an integration unit 210-1 of the 1st channel and an integration unit 210-n of the $n^{th}$ channel are depicted. The other channels may be embodied with reference according to following descriptions. Besides, the multi-channel integrator 200 also has a first switch SW1 and a second switch SW2. First terminals of the first switch SW1 and the second switch SW2 both receive a first reference voltage $V_{ref1}$. The first switch SW1 and the second switch SW2 are controlled by a signal RESETB inverted from the reset signal RESET.

In the embodiment, the implementations of the integration units 210-1 to 210-n are all identical. For example, the integration unit 210-1 includes an operational amplifier (OP-AMP) 211, a feedback switch SWfb, a third switch SW3, a fourth switch SW4, and a feedback capacitor Cfb. The OP-AMP 211 has a first input terminal, a second input terminal, and an output terminal. In the integration unit 210-1, the first input terminal of the OP-AMP 211 is coupled to a first sensor line of the touch panel 110, and the second input terminal of the OP-AMP 211 receives a second reference voltage $V_{ref}$. In the embodiment, the first input terminal of the OP-AMP 211 is an inverting input terminal, and the second input terminal of the OP-AMP 211 is a non-inverting input terminal. In addition, designers applying the embodiment may design the levels of the first reference voltage $V_{ref1}$ and the second reference voltage $V_{ref}$ based on the design requirement. For example, the first reference voltage $V_{ref1}$ and/or the second reference voltage $V_{ref}$ are/is set to half of a system voltage VDDA (i.e. VDDA/2), a band-gap voltage, +5V, or other fixed voltages. In the embodiment, the second reference voltage $V_{ref}$ is transferred between 0V and 5V in accordance with the reset signal RESET (referring to FIG. 3).

A first terminal and a second terminal of the feedback switch SWfb are respectively coupled to the first input terminal and the output terminal of the OP-AMP 211. A first terminal of the third switch SW3 is coupled to the first input terminal of the OP-AMP 211, and a second terminal of the third switch SW3 is coupled to a first terminal of the feedback capacitor Cfb. A first terminal of the fourth switch SW4 is coupled to the output terminal of the OP-AMP 211, and a second terminal of the fourth switch SW4 is coupled to a second terminal of the feedback capacitor Cfb.

The first terminal of the feedback capacitor Cfb is coupled to a second terminal of the first switch SW1, and the second terminal of the feedback capacitor Cfb is coupled to a second terminal of the second switch SW2. Hence, the smaller feedback capacitor Cfb of each of the integration units 210-1 to 210-n are connected in parallel, and form a big equivalent capacitor (i.e. n×Cfb). The equivalent capacitor provides charges for the integration units 210-1 to 210-n by turns, so that output saturations of the integration units 210-1 to 210-n are prevented. Thus, the capacitance of each of the feedback capacitors Cfb respectively of the integration units 210-1 to 210-n is designed smaller, such that an chip area occupied by the multi-channel integrator is significantly reduced. Namely, the more the channel number n of the multi-channel integrator 200 is, the larger the IC area is reduced. A detail description that how the integration units 210-1 to 210-n use the big equivalent capacitor (i.e. the feedback capacitors Cfb of the integration units 210-1 to 210-n) by turns is provided in the following paragraph.

Figure 3:
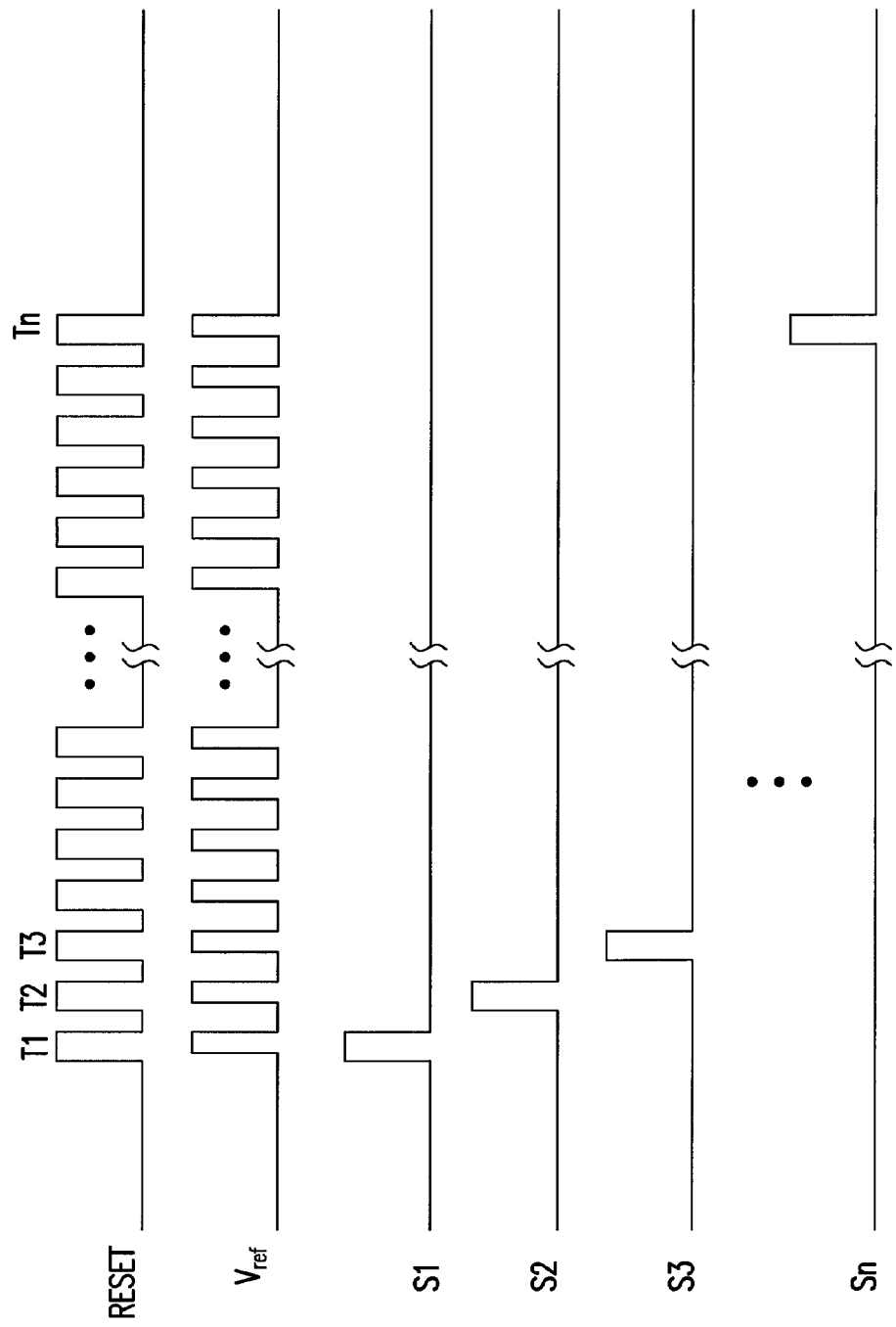
FIG. 3 is a diagram showing a timing control of each of switches in FIG. 2 in an embodiment of the present invention.

FIG. 3 is a diagram showing a timing control of each of switches in FIG. 2 in an embodiment of the present invention. Referring to both FIG. 2 and FIG. 3, when a system is during a power-on period or a reset period, the system sets a reset signal RESET to an enable state, such as a logic-low level. The first switch SW1 and the second switch SW2 are controlled by a signal RESETB inverted from the reset signal RESET. When the reset signal RESET is in the logic-low level (i.e. the signal RESETB is set to the logic-high level), the first switch SW1 and the second switch SW2 are turned on, all the third switches SW3 and all the fourth switches SW4 of the integration units 210-1 to 210-n are turned off, and all the feedback switches SWfb of the integration units 210-1 to 210-n are turned on.

When a first channel period T1 starts, the system sets the reset signal RESET to a disable state, such as a logic-high level as shown in FIG. 3 (i.e. the signal RESETB is set to the logic-low level). During the first channel period T1, a control signal S1 responds to the reset signal RESET and is transferred to the logic-high level, and other control signals S2~Sn are maintained in the logic-low level. A control signal S1' in FIG. 2 is an inverted signal of the control signal S1, and a control signal Sn' is an inverted signal of the control signal Sn. Hence, during the first channel period T1, the first switch SW1 and the second switch SW2 are turned off. The third switch SW3 and the fourth switch SW4 of the 1st integration unit 210-1 are turned on, and the feedback switch SWfb thereof is turned off. As a result, the integration unit 210-1 uses the feedback capacitors Cfb of the integration units 210-1 to 210-n during the first channel period T1, so that the output saturation of the integration unit 210-1 is prevented. Meanwhile, the third switches SW3 and the fourth switches SW4 of the other integration units (e.g. the integration unit 210-n) are turned off, and the feedback switches SWfb thereof are turned on. Therefore, each of the other integration units (e.g. the integration unit 210-n) is set to an unity-gain configuration during the first channel period T1.

During the period that a current channel period (e.g. the first channel period T1) finishes and a next channel period (e.g. a second channel period T2) does not yet start (equivalent to the reset period), the system sets the reset signal RESET to the logic-low level as shown in FIG. 3. Hence, the control signal S1 responds to the reset signal RESET, and is transferred to a logic-low level. During the period, the first switch SW1 and the second switch SW2 are turned on. All the third switches SW3 and all the fourth switches SW4 of the integration units 210-1 to 210-n are turned off, and all the feedback switches SWfb of the integration units 210-1 to 210-n are turned on. Therefore, each of the integration units 210-1 to 210-n is set to a unity-gain configuration, and the feedback capacitor Cfb of each of the integration units 210-1 to 210-n is reset to the first reference voltage $V_{ref1}$.

After the feedback capacitor Cfb of each of the integration units 210-1 to 210-n is reset completely, the second channel period T2 starts. During the second channel period T2, a control signal S2 responds to the reset signal RESET and is transferred to the logic-high level, and other control signals S1, S3~Sn are maintained in the logic-low level. As a result, a 2nd integration unit (not shown in FIG. 2, and can be embodied with reference according to the description of the integration unit 210-1) uses the feedback capacitors Cfb of the integration units 210-1 to 210-n during the second channel period T2, so that the output saturation of the 2nd integration unit is prevented. And each of the other integration units (e.g. the integration units 210-1 and 210-n) is set to the unity-gain configuration during the second channel period T2. Accordingly, when an $n^{th}$ channel period Tn starts, the $n^{th}$ integration unit 210-n uses the feedback capacitors Cfb of the integration units 210-1 to 210-n so that the output saturation of the $n^{th}$ integration unit 210-n is prevented. Besides, the other integration units, such as the integration unit 210-1, are set to the unity-gain configuration during the $n^{th}$ channel period Tn. The operation details of the second channel period T2, a third channel period T3 . . . and the $n^{th}$ channel period Tn can be referred to the description of the first channel period T1. Detailed descriptions are not repeated.

Figure 4:
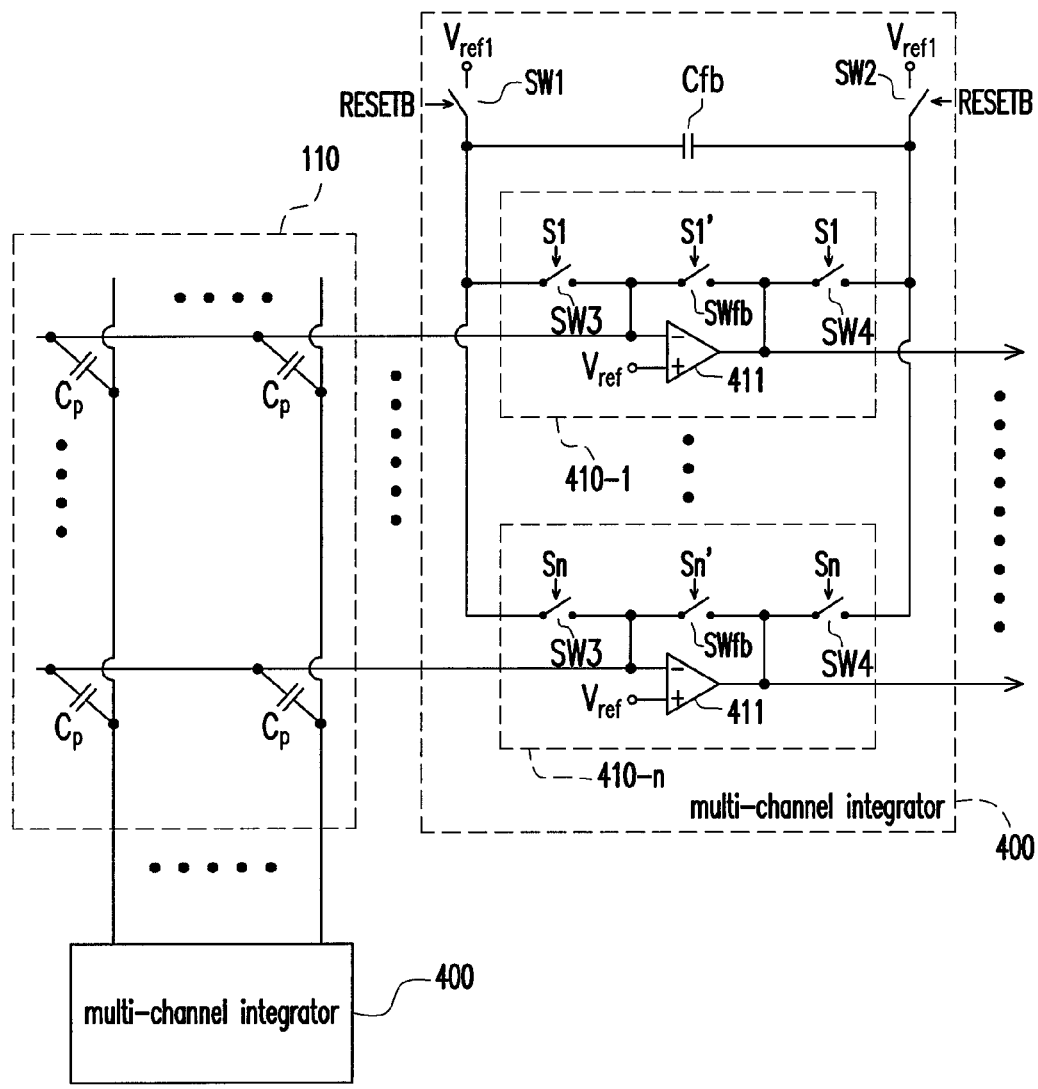
FIG. 4 is another circuit diagram of a multi-channel integrator in an embodiment of the present invention.

FIG. 4 is another circuit diagram of a multi-channel integrator in an embodiment of the present invention. The multi-channel integrator 400 has n channels, and an integration unit is disposed in each of the channels. In the drawings, only an integration unit 410-1 of the 1st channel and an integration unit 410-n of the $n^{th}$ channel are depicted. The other channels may be embodied with reference according to following descriptions. Besides, the multi-channel integrator 400 also has a first switch SW1, a second switch SW2 and a feedback capacitor Cfb. First terminals of the first switch SW1 and the second switch SW2 both receive a first reference voltage $V_{ref1}$. A first terminal and a second terminal of the feedback capacitor Cfb are respectively coupled to a second terminal of the first switch SW1 and a second terminal of the second switch SW2.

In the embodiment, the implementations of the integration units 410-1 to 410-n are identical. For example, the integration unit 410-1 includes an operational amplifier (OP-AMP) 411, a feedback switch SWfb, a third switch SW3, and a fourth switch SW4. The OP-AMP 411 has a first input terminal, a second input terminal and an output terminal. In the integration unit 410-1, the first input terminal of the OP-AMP 411 is coupled to a first sensor line of the touch panel 110, and the second input terminal of the OP-AMP 411 receives a second reference voltage $V_{ref}$. Here, the first input terminal of the OP-AMP 411 is an inverting input terminal, and the second input terminal of the OP-AMP 411 is a non-inverting input terminal. In addition, designers may design the levels of the first reference voltage $V_{ref1}$ and the second reference voltage $V_{ref}$ based on the design requirement. In the embodiment, the first reference voltage $V_{ref1}$ is set to be a fixed voltage. For example, the first reference voltage $V_{ref1}$ is set to a ground voltage (i.e. 0V). The second reference voltage $V_{ref}$ is transferred between 0V and 5V in accordance with the reset signal RESET (referring to FIG. 3).

A first terminal and a second terminal of the feedback switch SWfb are respectively coupled to the first input terminal and the output terminal of the OP-AMP 411. A first terminal of the third switch SW3 is coupled to the first input terminal of the OP-AMP 411, and a second terminal of the third switch SW3 is coupled to a first terminal of the feedback capacitor Cfb. A first terminal of the fourth switch SW4 is coupled to the output terminal of the OP-AMP 411, and a second terminal of the fourth switch SW4 is coupled to a second terminal of the feedback capacitor Cfb. By controlling the inner switches SW3, SW4 and SWfb of the integration units 410-1 to 410-n, the integration units 410-1 to 410-n can use the feedback capacitor Cfb by turns. The more the channel number n of the multi-channel integrator 400 is, the larger the IC area is saved. A detail description that how the integration units 410-1 to 410-n use the feedback capacitor Cfb by turns is provided in the following paragraph.

The first switch SW1 and the second switch SW2 are controlled by a signal RESETB inverted from the reset signal RESET. Referring to both FIG. 3 and FIG. 4, when a system is during a power-on period or a reset period, the system sets a reset signal RESET to an enable state, such as a logic-low level (i.e. the signal RESETB is set to the logic-high level). During the period, the first switch SW1 and the second switch SW2 are turned on, and a voltage across the feedback capacitor Cfb is reset to the first reference voltage $V_{ref1}$. Besides, all the third switches SW3 and all the fourth switches SW4 of the integration units 410-1 to 410-n are turned off, and all the feedback switches SWfb of the integration units 410-1 to 410-n are turned on. Therefore, all of the integration units 410-1 to 410-n are set to a unity-gain configuration during the period when the reset signal RESET is in the logic-low level.

When a first channel period T1 starts, the system sets the reset signal RESET to a disable state, such as a logic-high level as shown in FIG. 3 (i.e. the signal RESETB is set to the logic-low level). During the first channel period T1, a control signal S1 responses to the reset signal RESET and is transferred to the logic-high level, and other control signals S2~Sn are maintained in the logic-low level. A control signal SF in FIG. 4 is an inverted signal of the control signal S1, and a control signal Sn' is an inverted signal of the control signal Sn. Hence, during the first channel period T1, the first switch SW1 and the second switch SW2 are turned off. The third switch SW3 and the fourth switch SW4 of the 1st integration unit 410-1 are turned on, and the feedback switch SWfb thereof is turned off. Therefore, the integration unit 410-1 uses the feedback capacitor Cfb. Meanwhile, the third switches SW3 and the fourth switches SW4 of the other integration units, such as the integration unit 410-n, are turned off, and the feedback switches SWfb thereof, such as the integration unit 410-n, are turned on. Therefore, except the integration unit 410-1, the other integration units are set to the unity-gain configuration during the first channel period T1.

During the period that the first channel period T1 finishes and a second channel period T2 does not yet start (equivalent to the reset period), the system sets the reset signal RESET to the logic-low level as shown in FIG. 3. Hence, the control signal S1 responds to the reset signal RESET and is transferred to a logic-low level. During the period, the first switch SW1 and the second switch SW2 are turned on. All the third switches SW3 and all the fourth switches SW4 of the integration units 410-1 to 410-$n$ are turned off, and all the feedback switches SWfb of the integration units 410-1 to 410-$n$ are turned on. Therefore, each of the integration units 410-1 to 410-$n$ is set to the unity-gain configuration, and the voltage of two terminals of the feedback capacitor Cfb is reset to the first reference voltage $V_{ref1}$.

As the feedback capacitor Cfb is reset completely, the second channel period T2 starts. During the second channel period T2, a control signal S2 responds to the reset signal RESET and is transferred to the logic-high level, and other control signals S1, S3~Sn are maintained in the logic-low level. As a result, a 2nd integration unit (not shown in FIG. 4, and can be embodied with reference according to the description of the integration unit 410-1) uses the feedback capacitor Cfb during the second channel period T2. Besides, the other integration units, such as the integration units 410-1 and 410-$n$, are set to the unity-gain configuration during the second channel period T2. Accordingly, when an $n^{th}$ channel period Tn starts, the $n^{th}$ integration unit 410-$n$ can use the feedback capacitor Cfb. Besides, the other integration units, such as the integration unit 410-1, are set to the unity-gain configuration during the $n^{th}$ channel period Tn. The operation details of the second channel period T2, the third channel period T3 . . . and the $n^{th}$ channel period Tn can be referred to the description of the first channel period T1. Detailed descriptions are not repeated.

Accordingly, the channels of the above-mentioned embodiments share a set feedback capacitor or one capacitor by turns, so that the chip area occupied by the multi-channel integrator is significantly reduced as well as the cost.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A multi-channel integrator comprising:
   a first switch having a first terminal receiving a first reference voltage;
   a second switch having a first terminal receiving the first reference voltage; and
   a plurality of integration units, wherein each of the integration units comprises:
      an operational amplifier (OP-AMP) having a first input terminal, a second input terminal and an output terminal, wherein the second input terminal receives a second reference voltage;
      a feedback switch having a first terminal and a second terminal respectively coupled to the first input terminal and the output terminal of the OP-AMP;
      a third switch having a first terminal coupled to the first input terminal of the OP-AMP;
      a fourth switch having a first terminal coupled to the output terminal of the OP-AMP; and
      a feedback capacitor having a first terminal coupled to a second terminal of the first switch and the second terminal of the third switch, the second terminal of the feedback capacitor coupled to a second terminal of the second switch and the second terminal of the fourth switch.

2. The multi-channel integrator of claim 1, wherein during a power-on period, the first switch and the second switch are turned on by a reset signal issued by a system, the third switches and the fourth switches are turned off by the reset signal, and the feedback switches are turned on by the reset signal.

3. The multi-channel integrator of claim 1, wherein during a reset period, the first switch and the second switch are turned on by a reset signal issued by a system, the third switches and the fourth switches are turned off by the reset signal, and the feedback switches are turned on by the reset signal.

4. The multi-channel integrator of claim 1, wherein during a channel period of a plurality of channel periods, the first switch and the second switch are turned off by a signal inverted from a reset signal issued by a system, the third switch and the fourth switch of a corresponding integration unit of the integration units are turned on by the signal inverted from the reset signal, the feedback switch of the corresponding integration unit is turned off, the third switches and the fourth switches of the other integration units are turned off by the signal inverted from the reset signal, and the feedback switches of the other integration units are turned on by the reset signal, wherein the channel period is a time period of performing integration operation for one of a plurality of channels of the multi-channel integrator.

5. The multi-channel integrator of claim 1, wherein the first input terminals of the OP-AMPS are inverting input terminals, and the second input terminals of the OP-AMPS are non-inverting input terminals.

6. The multi-channel integrator of claim 1, wherein the first reference voltage is equal to the second reference voltage.

7. The multi-channel integrator of claim 1, wherein the first input terminals of the OP-AMPS of the integration units are coupled to sensor lines of an external touch panel connected to the multi-channel integrator respectively.

8. A multi-channel integrator comprising:
   a first switch having a first terminal receiving a first reference voltage;
   a second switch having a first terminal receiving the first reference voltage;
   a feedback capacitor having a first terminal and a second terminal respectively coupled to a second terminal of the first switch and a second terminal of the second switch; and
   a plurality of integration units, wherein each of the integration units comprises:
      an operational amplifier (OP-AMP) having a first input terminal, a second input terminal and an output terminal, wherein the second input terminal receives a second reference voltage;
      a feedback switch having a first terminal and a second terminal respectively coupled to the first input terminal and the output terminal of the OP-AMP;
      a third switch having a first terminal coupled to the first input terminal of the OP-AMP, and a second terminal coupled to the first terminal of the feedback capacitor; and
      a fourth switch having a first terminal coupled to the output terminal of the OP-AMP, and a second terminal coupled to the second terminal of the feedback capacitor.

9. The multi-channel integrator of claim 8, wherein during a power-on period, the first switch and the second switch are turned on by a reset signal issued by a system, the third switches and the fourth switches are turned off by the reset signal, and the feedback switches are turned on by the reset signal.

10. The multi-channel integrator of claim 8, wherein during a reset period, the first switch and the second switch are turned on by a reset signal issued by a system, the third switches and the fourth switches are turned off by the reset signal, and the feedback switches are turned on by the reset signal.

11. The multi-channel integrator of claim 8, wherein during a channel period of a plurality of channel periods, the first switch and the second switch are turned off by a signal inverted from a reset signal issued by a system, the third switch and the fourth switch of a corresponding integration unit of the integration units are turned on by the signal inverted from the reset signal, the feedback switch of the corresponding integration unit is turned off by the signal inverted from the reset signal, the third switches and the fourth switches of the other integration units are turned off by the signal inverted from the reset signal, and the feedback switches of the other integration units, are turned on by the reset signal, wherein the channel period is a time period of performing integration operation for one of a plurality of channels of the multi-channel integrator.

12. The multi-channel integrator of claim 8, wherein the first input terminals of the OP-AMPs are inverting input terminals, and the second input terminals of the OP-AMPs are non-inverting input terminals.

13. The multi-channel integrator of claim 8, wherein the first reference voltage is equal to the second reference voltage.

14. The multi-channel integrator of claim 8, wherein the first input terminals of the OP-AMPs of the integration units are coupled to sensor lines of an external touch panel connected to the multi-channel integrator respectively.

\* \* \* \* \*